United States Patent

Ghirelli et al.

(10) Patent No.: US 8,821,824 B2
(45) Date of Patent: Sep. 2, 2014

(54) PROCESS FOR THE DETRITIATION OF SOFT HOUSEKEEPING WASTE AND PLANT THEREOF

(75) Inventors: Nicolas Ghirelli, Marseilles (FR); Silvano Tosti, Frascati (IT); Pierre Trabuc, Venelles (FR); Fabio Borgognoni, Iesi (IT); Karine Liger, Pertuis (FR); Alessia Santucci, Colonna (IT); Xavier Lefebvre, Abingdon (GB)

(73) Assignees: ENEA—Agenzia Nazionale per le Nuove Tecnologie, l'Energia e lo Sviluppo Economico Sostenibile, Rome (IT); Commissariat a l'Energie Atomique et aux Energies, Paris (FR)

( * ) Notice: Subject to any disclaimer, the term of this patent is extended or adjusted under 35 U.S.C. 154(b) by 0 days.

(21) Appl. No.: 13/805,418

(22) PCT Filed: Jun. 21, 2011

(86) PCT No.: PCT/IT2011/000211
§ 371 (c)(1),
(2), (4) Date: Jan. 16, 2013

(87) PCT Pub. No.: WO2011/161709
PCT Pub. Date: Dec. 29, 2011

(65) Prior Publication Data
US 2013/0115156 A1 May 9, 2013

(30) Foreign Application Priority Data

Jun. 22, 2010 (IT) .............................. RM2010A0340

(51) Int. Cl.
*C01F 13/00* (2006.01)
*G21F 9/02* (2006.01)
*G21F 9/00* (2006.01)
*G21F 9/30* (2006.01)

(52) U.S. Cl.
CPC *G21F 9/02* (2013.01); *G21F 9/007* (2013.01); *G21F 9/30* (2013.01)

USPC .......................................... 423/249; 423/648.1

(58) Field of Classification Search
CPC .............. G21F 9/02; G21F 9/007; G21F 9/30
USPC ................................................ 423/249, 648.1
See application file for complete search history.

(56) References Cited

U.S. PATENT DOCUMENTS 4,589,891 A   5/1986  Iniotakis et al.
4,699,637 A * 10/1987  Iniotakis et al. .................. 96/10

(Continued)

FOREIGN PATENT DOCUMENTS

DE    36 06 317   9/1987
EP    0069222     1/1983

(Continued)

OTHER PUBLICATIONS

International Search Report dated Sep. 6, 2011, corresponding to PCT/IT2011/000211.

*Primary Examiner* — Paul Wartalowicz
(74) *Attorney, Agent, or Firm* — Young & Thompson

(57) ABSTRACT

A process for removal of tritium from materials that are contaminated thereby envisages the use of a detritiation reactor RT, in which the reaction for the removal of tritium from the waste takes place, the waste being recovered by a flow of moist inert gas in which an extremely low percentage of humidity is used. The heated waste releases a current of tritiated gases, the current of gases being removed from the reactor via the moist inert gas, which conveys it into a membrane reactor RM for decontamination. The membrane reactor, in fact, is able to remove selectively the tritium present in the mixture of gases: there is thus the dual advantage of purifying the mixture of gases and of recovering the tritium contained therein.

10 Claims, 4 Drawing Sheets

(56) References Cited

U.S. PATENT DOCUMENTS

| | | | |
|---|---|---|---|
| 4,707,342 A | | 11/1987 | Iniotakis et al. |
| 4,875,945 A | | 10/1989 | Penzhorn et al. |
| 4,882,093 A | * | 11/1989 | Giroux et al. ............ 588/1 |
| 7,470,350 B2 | * | 12/2008 | Bonnett et al. ............ 203/5 |

FOREIGN PATENT DOCUMENTS

| | | |
|---|---|---|
| EP | 0141176 | 5/1985 |
| FR | 2620849 | 3/1989 |

\* cited by examiner

PROCESS FOR THE DETRITIATION OF SOFT HOUSEKEEPING WASTE AND PLANT THEREOF Removal of tritium (3H, T) from all the materials that are contaminated thereby is a fundamental process for all the plants that operate with tritium. Said process has two important functions: the first regards the limitation of the release of tritium outside plants; the second is linked to the possibility of storing materials already completely de-categorized (with much lower levels of contamination and hence with much lower storing costs). So far the processes used for recovering tritium from said materials envisage as by-product tritiated water, with a low concentration of tritium, and, at times, further radioactive gaseous flows.

The process according to the present invention proposes a solution to this problem. In said innovative process, in fact, tritium is recovered from the waste thanks to a thermal treatment (T<120° C.), in a slightly oxidizing atmosphere. The invention envisages the use of a reactor in which the reaction for removal of tritium from the waste takes place, said waste being recovered by means of a flow of moist inert gas in which an extremely low percentage of humidity is used. The heated waste releases a current of tritiated gases, this current of gases being removed from the reactor via the moist inert gas, which conveys it into a membrane reactor for decontamination. The membrane reactor, in fact, is able to remove selectively the tritium present in the mixture of gases: there is thus the dual advantage of purifying the mixture of gases and of recovering the tritium contained therein.

A better understanding of the invention will be gleaned from the ensuing detailed description and with reference to the annexed figures, which illustrate, purely by way of non-limiting example, a preferred embodiment.

1. STATE OF THE ART

Handling of radioactive waste is a critical problem both for plants that use tritium and for fusion machines that envisage tests with tritium. The so-called "soft housekeeping waste" is produced throughout the life cycle and also during disposal of the aforesaid plants and machines (JET, ITER, DEMO); their treatment is hence an issue of fundamental importance.

Within a nuclear plant, it is estimated that the amount of housekeeping waste produced is approximately 0.2 kg/h per worker. The so-called "soft housekeeping waste" comprises gloves, overshoes, overalls, gas filters, paper, etc.

In order to arrive at the most promising treatment processes, in the last few years there have been studied on a laboratory scale various techniques aimed at removal of tritium from this kind of waste [2]. The major difficulty consists in reaching a compromise between an adequate decontamination factor, which results in a potential de-categorization of the final waste, and an acceptable volume of product resulting from the detritiation process.

Amongst all the techniques illustrated in the references [3], a process already studied with good characteristics of industrial effectiveness and feasibility regards continuous combustion with pure oxygen at atmospheric pressure. In this process, the gases produced during combustion need to be treated before being stored.

Figure 1:
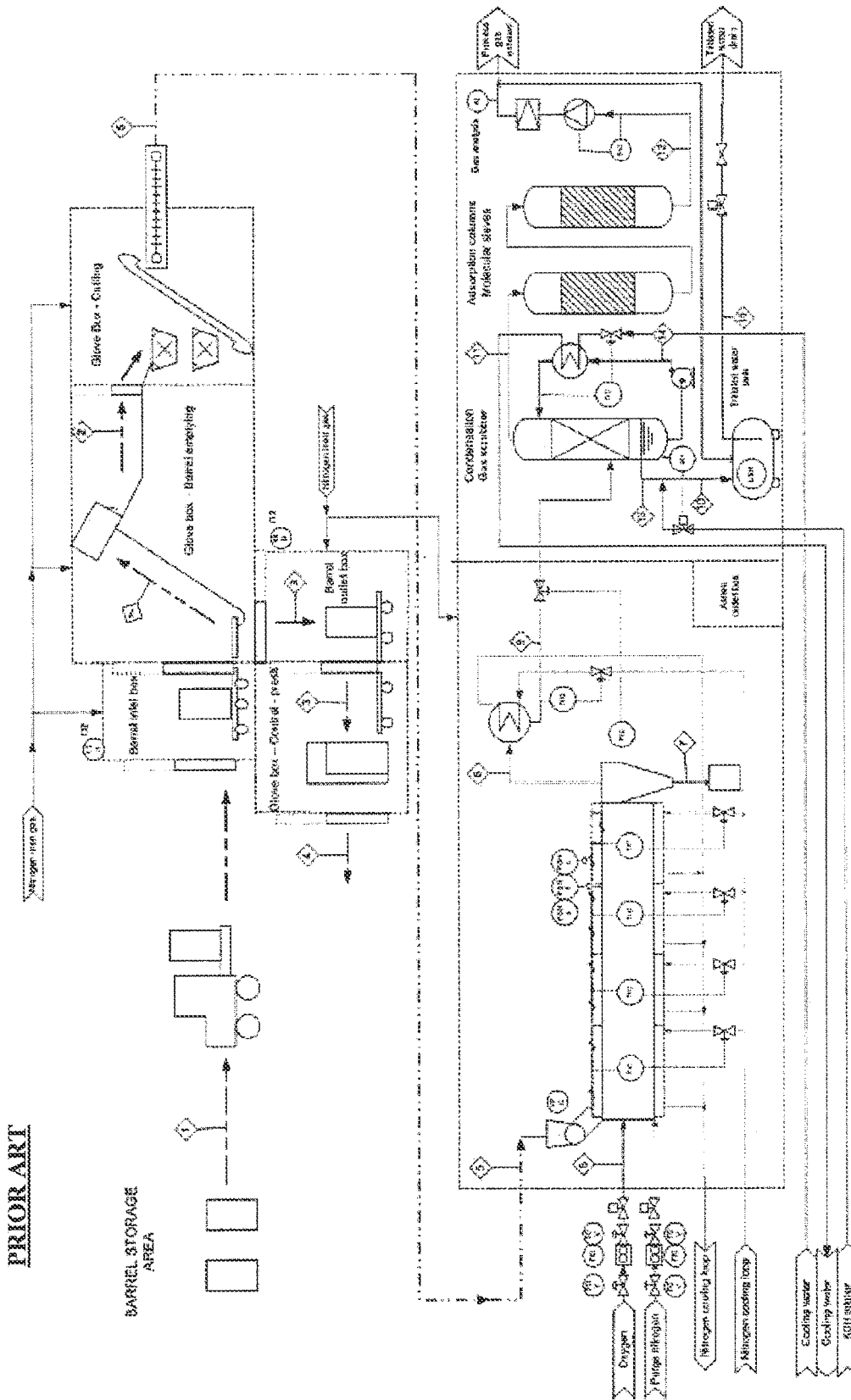
FIG. 1 shows a complete scheme of a process of a known type.

FIG. 1 illustrates the complete scheme of said known process, in which there is a gas-treatment unit that envisages the following steps: separation of the solids and of the flow of the gases through a cyclone; condensation of the tritiated water (4° C.); neutralization of the non-condensable gases through a solution of KOH (50 wt %); and, as final operation, absorption on a molecular-sieve bed of $Q_2O$, $CO_2$ and $NO_x$ (the letter Q indicates generically a hydrogen isotope and hence also tritium).

Figure 2:
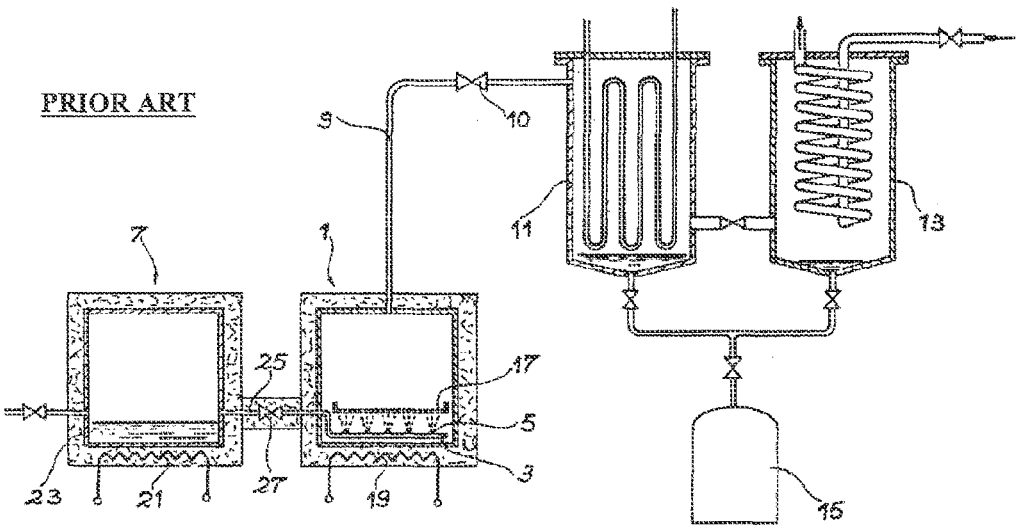
FIG. 2 shows a complete scheme of a further process of a known type.

As regards the process described in the reference [4] and illustrated in FIG. 2, it is based upon injection of vapour into a container (1) where the (dried) waste is previously loaded. The water vapour produced in the vapour generator (7) is set in (1) in strict contact with the waste and promotes extraction of tritium therefrom. The contaminated water vapour is sent into a two-stage condenser through the piping (9). The first stage (11) operates at 15° C., whilst the second stage (13) operates at the temperature of liquid nitrogen: in this way, all the tritium can be gathered in the form of tritiated water in the tank (15). The main disadvantage of this known method is represented by the fact that in order to separate tritium from the tritiated water a further detritiation process is necessary.

2. TECHNICAL DESCRIPTION OF THE INVENTION

The process according to the present invention advantageously enables simultaneous removal of tritium from laboratory waste (de-categorization) and its recovery in the gaseous phase (valorization).

In particular, according to the invention, use of two devices in series is envisaged: a reactor RT for removal of tritium, which carries out detritiation of the waste, and a membrane reactor RM in which tritium is recovered in the gaseous form. The membrane used is preferably, but not exclusively, made of palladium alloy.

In the ensuing sections, using as guide a block diagram and a flowchart, the operating modalities of the process and the main functions of the two reactors RT and RM are described.

2.1 Block Diagram

Figure 3:
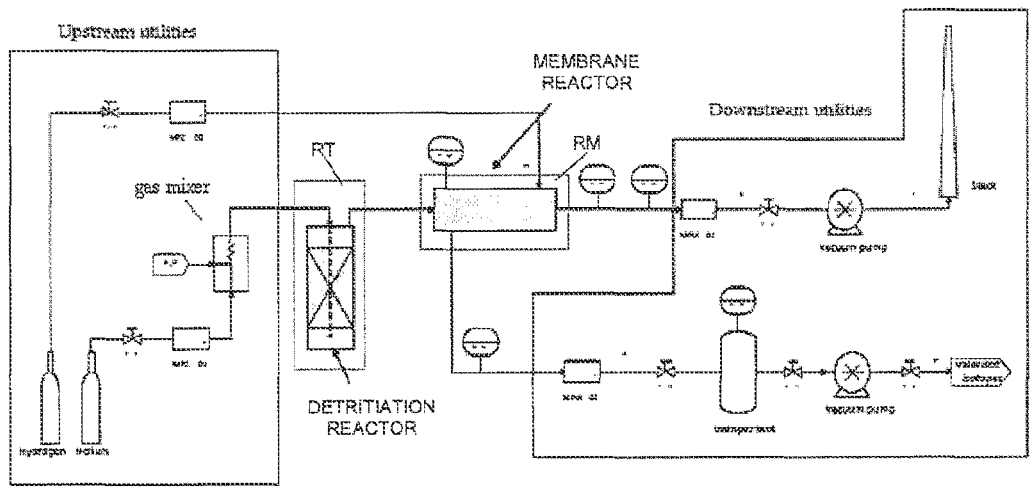
FIG. 3 is a block diagram of a plant for implementing the process according to the invention.
Figure 4:
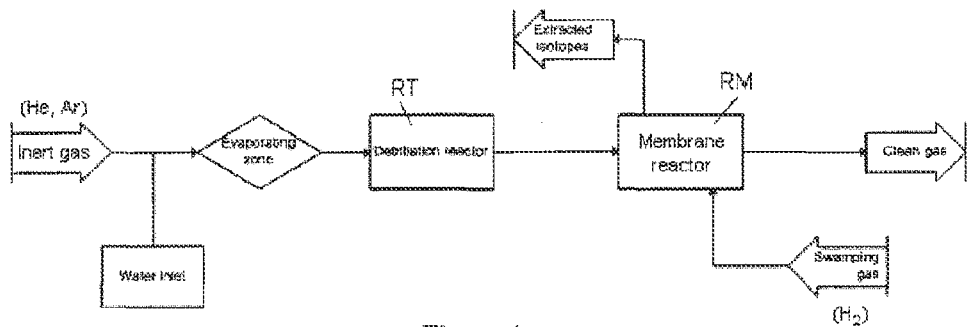
FIG. 4 shows in greater detail the plant of FIG. 3.

The ensuing description of the plant for implementing the process according to the invention refers to the diagram appearing in FIG. 3.

Inert Gas

The inert gas comes, for example, from commercial cylinders: said gas can be helium or argon, or some other gas suited for the purpose, the flow of which is controlled and recorded.

Demineralized Water

Demineralized water, without tritium, is used as decontaminating agent; the amount of water is controlled, optimised, and recorded. This water is stored at ambient temperature in an appropriated container.

Evaporating Zone

In this area evaporation of water and mixing thereof with the inert gas take place in a device (gas mixer) in which both of the flows (liquid and gas) are mixed and heated. The heat supplied for heating and evaporation is controlled and recorded. The internal volume of said evaporation device must be optimised in order to avoid dead volumes. Consequently, at outlet from this mixing area there is a moist gas that feeds the reactor RT in which the detritiation reaction takes place. The presence of water is important since it favours transfer of tritium from the waste to the inert gas.

Detritiation Reactor

The detritiation reactor RT is a hermetically sealed container in which the reaction of removal of tritium from the waste takes place. Detritiation can be considered as decontamination from tritium. This operation is favoured at temperatures higher than atmospheric temperature; for this reason, according to the type of the waste (mainly plastic) the reactor is kept at a temperature of 120° C. It should also be emphasized that, in addition to the temperature, another important parameter that regards sizing of the reactor is the time of stay of the moist gas.

This stay time must be long enough to guarantee transfer of tritium and of the (hydrogen) isotopes without, however, high values of concentration of tritium in the moist inert gas leaving the reactor RT being reached. For this purpose it is necessary to guarantee a high flow rate of the moist inert gas (approximately 30 or 50 times the internal volume of the reactor per hour). Another parameter to be considered is the time of stay of the waste to be detritiated: this must be long enough to guarantee that the required decontamination values are reached.

Membrane Reactor

A membrane reactor is a device that combines in a single device the properties of separation of a membrane with the characteristics of a catalytic-bed reactor. It enables removal of one (or more) products from the site of the reaction itself, thus enabling reaction conversions that are higher than those of a traditional reactor. Said device has been developed at the ENEA laboratories of Frascati.

Swamping Gas

The swamping gas is supplied by commercial cylinders: to obtain the maximum isotope-exchange effect in the detritiation reactions pure hydrogen is preferably used.

The flow of the swamping gas is controlled and optimised according to the characteristics of the waste and to the process requirements (amount of waste, level of tritium content, decontamination factor, etc.).

In the plant (FIG. 3) there may be distinguished various sections: the utilities (upstream and downstream); the detritiation reactor RT; and the gas-treatment unit RM.

The upstream utilities basically regard supply of inert gas (He or Ar) and swamping gas ($H_2$), which is ensured by commercial cylinders. The flow of the gases is controlled through flow controllers and recorded in order to monitor the flows of the incoming gases. A water injection system and an evaporator are connected to the inert-gas line in order to obtain moist gas. The degree of humidity is determined knowing and controlling the exact amount of water and gas.

The temperature of the evaporator is kept at 120° C. in order to prevent condensation in the connectors between the evaporator and the reactor RT. The material used for the connectors, the connections, and the valves is preferably stainless steel in order to guarantee an optimal seal and reduce corrosion phenomena.

2.2 Flowchart

Figure 5A:
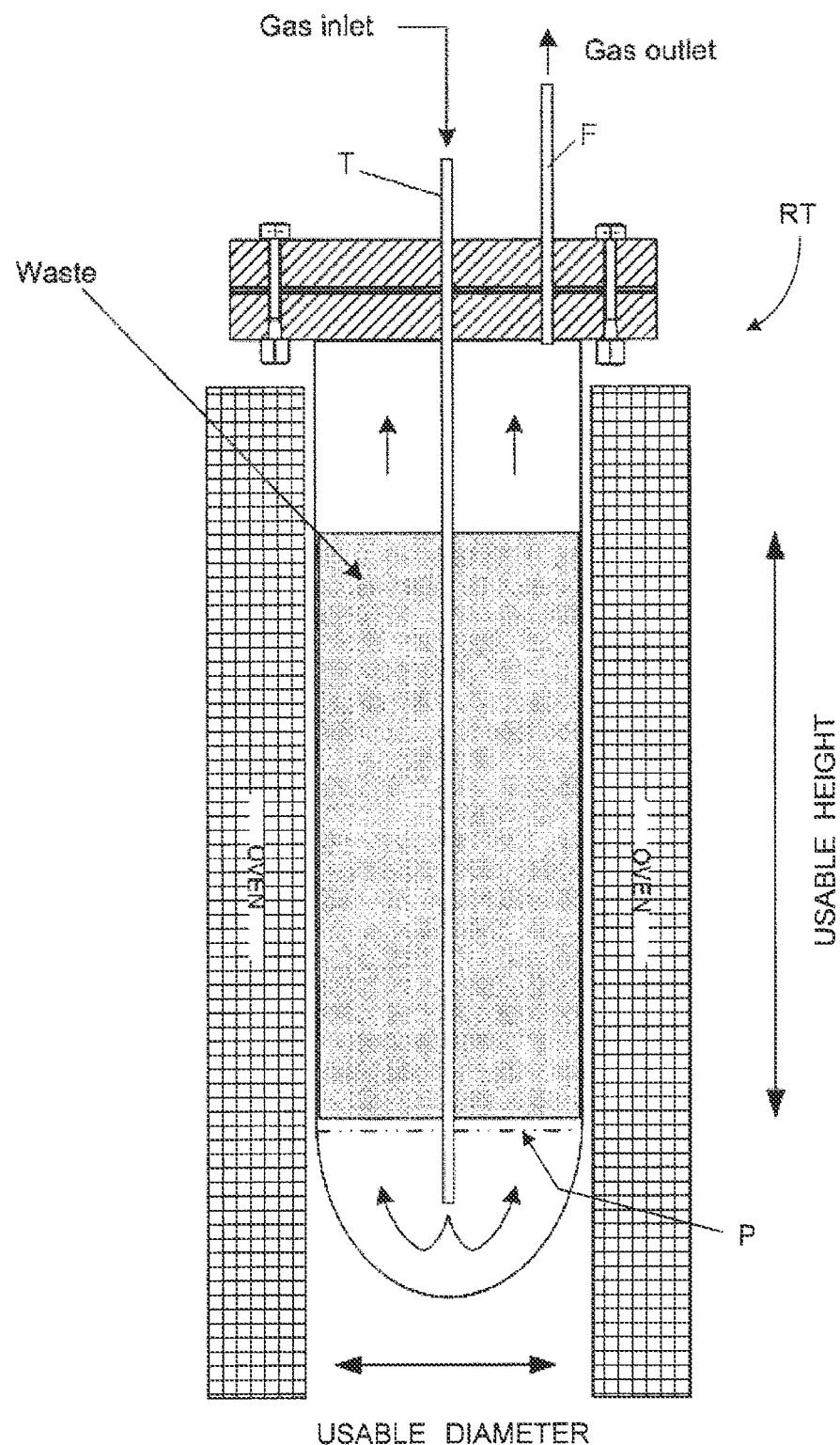
FIG. 5A is a scheme of a detritiation reactor used in the process according to the present invention.

The waste to be treated is placed within a detritiation reactor RT, the scheme of which is illustrated in FIG. 5A. In order to homogenize better the waste a preliminary shredding step should be envisaged. Within the reactor RT the waste is positioned on a bottom perforated plate P (fixed-bed reactor) so as to enable circulation of the moist inert gas through the waste itself. Provided in the top flange of the reactor RT is a metal inlet tube T that traverses the area for containing the waste and terminates on the bottom of the reactor RT itself, underneath said perforated plate P, with the function of transporting the moist inert gas underneath the waste.

Also provided in said top plate is a duct F for enabling outflow of the current of the gases containing tritium.

In order to facilitate thermal desorption, the reactor RT is introduced into an oven (see FIG. 5A), which controls and regulates the temperature of the reactor RT around the predefined set point (120° C.) The control of the temperature is performed, for example, via a thermocouple positioned on the outer wall of the reactor. The reactor RT operates at atmospheric pressure or at a pressure slightly higher than atmospheric pressure.

Gas-Treatment Unit

The unit for treating the gases containing tritium basically consists of a membrane reactor RM that preferably uses membranes made of Pd—Ag alloy. It should be noted that the alloys commonly used for the permeator tubes are palladium-based alloys, such as, for example, PdCu, but also employed are metal alloys with a base of Ni, Nb, V, Ta, Ti. The thicknesses of practical interest for said dense metal tubular membranes substantially fall in the range 50-200 μm.

The membrane reactor used in the process described herein is provided with thin-walled permeator tubes (as has been already said, the wall thickness falls within the range 50-150 μm) made of a commercially available palladium-silver alloy (23-25 wt % of Ag).

The permeator tube (see FIG. 6) is housed within the module preferably according to a configuration of the "finger-like" type. Heating of the membrane reactor RM, the working temperature of which falls within the range 300-400° C., is obtained through the passage of an electric current through the tube itself to obtain heating of an ohmic type.

Figure 6:
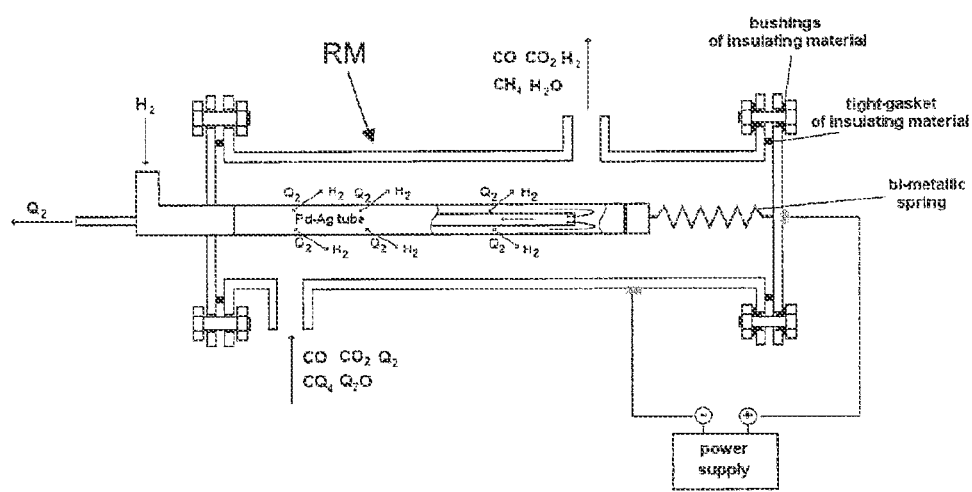
FIG. 6 is a scheme of a membrane reactor used in the process according to the present invention.

The gas containing tritium to be treated is sent into the shell of the reactor RM, whilst the swamping gas, which in the example described herein is a current of pure hydrogen, is sent into the lumen of the membrane (as represented in FIG. 6).

Alternatively, the current of gas to be treated and the current of pure swamping hydrogen can be reversed.

Figure 5B:
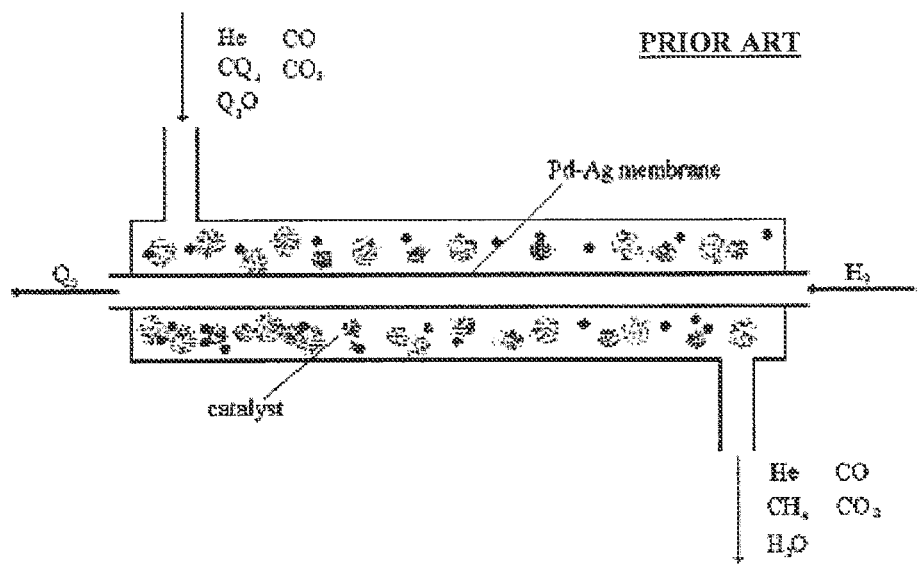
FIG. 5B is a scheme of a membrane reactor of a known type.

The operating scheme is substantially that of a reactor of a PERMCAT type [5, 6, 7], illustrated in FIG. 5B.

The gas to be treated (the letter Q indicates generically a hydrogen isotope and hence also tritium) is sent on a catalytic bed set—in this case—in the shell of the reactor RM, whilst sent in countercurrent into the lumen of the membrane is pure hydrogen. The membrane reactor RM performs through the membrane itself (selectively permeable to just the hydrogen isotopes) the isotope-exchange that carries out the required process.

Described by way of example are two possible isotope-exchange reactions corresponding to detritiation of methane and water:

$$2H_2 + CQ_4 \Leftrightarrow CH_4 + 2Q_2 \qquad (1)$$

$$H_2 + Q_2O \Leftrightarrow H_2O + Q_2 \qquad (2)$$

It may be readily understood that in the reactions (1) and (2) the tritium atoms contained respectively in the methane and in the water are exchanged with $H_2$ (protium, i.e., hydrogen of atomic mass 1).

The innovative content of the membrane reactor RM used in the present invention is represented by the use of a particular device applied to the closed end of the permeator tube. Said device consists of a bimetallic spring, which has two separate functions:

applying a tensile force on the permeator tube so as to prevent contact between the tube itself and the internal wall of the module, and hence prevent deformations of the membrane linked to the thermal cycles and hydrogenation cycles; and ensuring a thermal continuity between the closed end of the permeator tube and the outside of the membrane module, and hence enabling heating of the tube by the Joule effect.

A solution proposed is that of providing said bimetallic spring using:

a wire made of Inconel®, able to guarantee, even at the operating temperatures, the required mechanical performance (i.e., capacity of applying on the permeator tube a tensile force sufficient to keep the tube itself in a linear position, even during its expansion); and a wire made of silver with a low resistance to ensure passage of electric current and prevent heating of the spring itself.

Downstream Utilities

The main task of the downstream section is:

monitoring of the level of contamination of the current of retentate gas leaving the membrane reactor (whether this be current leaving the lumen in the case of FIG. 3 or current coming from the shell of the reactor in the case of FIG. 6) so as to ensure release in conditions of safety into the environment (by means of a flue), and supply of the value of negative pressure necessary for circulation of the gas;

storage of the extracted isotopes (current of swamping hydrogen enriched with tritium released from the contaminated gases), and supply also in this case of the value of negative pressure necessary for circulation of the gas. At this point, the isotopes extracted during the process can be valorized.

The negative pressure for the two circuits (decontaminated-gas line and tritiated-hydrogen line) is obtained by two vacuum pumps, which are connected to the circuit via appropriate regulating valves. The hydrogen pressure on the permeate side is approximately 900 mbar, whilst the hydrogen pressure on the retentate side is approximately 100 mbar.

The pressure sensors and the thermocouples also form part of the utilities and are used for regulation of the process parameters. All the information is recorded through a data-acquisition system.

For what has been said so far, the process described herein basically comprises the following steps:

A) shredding and mixing uniformly the waste to be detritiated;

B) placing said material to be treated in a detritiation reactor RT;

C) sending the inert gas and the demineralized water to an evaporation/mixing device;

D) feeding said moist gaseous mixture, constituted by inert gas and vapour, to said reactor RT so that said mixture traverses all the material to be detritiated, giving rise to formation of a moist gaseous current containing tritium;

E) sending said gaseous current containing tritium to a purposely provided catalytic membrane reactor RM; and F) feeding said membrane reactor RM with a swamping gas such as, for example, pure hydrogen, thus obtaining that from the reactor RM itself there come out, as end products, a gaseous current of hydrogen isotopes containing tritium extracted from the treated waste and a gaseous current of detritiated gases.

3. APPLICATIONS

The process forming the subject of the present patent has been specifically designed for decontaminating (detritiating) waste of the so-called "soft housekeeping" type (for example gloves, paper, etc.) coming from JET laboratories.

Said waste is first treated within a detritiation reactor designed and developed by CEA. The process proposed, in addition to decontamination of the waste, also enables recovery and valorization of the tritium extracted (1 gT~30 000 €). These Research and Development activities were conducted in the framework of the Tasks JW9-FT-2.34 (Preliminary Design and Tests for the detritiation of JET Soft House Keeping Waste) and JW10-FT-2.35 (Implementation of a Pd-membrane reactor into a detritiation facility treating JET Soft House Keeping Waste) that refer to the Research and Development programme "EFDA JET Fusion Technology Workprogramme". The purpose of this activity is to design and assemble a pilot plant to test this new detritiation process.

More in general, this device can be applied to the treatment of material coming from the machines tokamak (for example, JET, ITER and DEMO) or else to all the structures in which hydrogen isotopes such as H (protium), D (deuterium), and T (tritium) are used.

According to the application it may be necessary to change one of the components (type of detritiation reactor, dimensional ratio, materials used, position of inlet and outlet, type of valves, type of pump), or else the dimensions of the objects described (length, diameter, type and volume of the catalyst, etc.).

According to the amount of waste to be treated or the degree of decontamination that is to be obtained it is likewise possible to use membrane devices that contain a number of permeator tubes or provide connections in series or in parallel of the membrane modules.

It is known that a person skilled in the sector will be able, by modifying the type of detritiation device, the type of membrane, etc., to design a similar process having the same functions.

4. REFERENCES

[1]. EFDA, European Fusion Development Agreement. ERB 5035 CT 99 0001. ANNEX VI, Information & Intellectual Property.

[2]. Rist-Lambert, A., Detritiation of soft housekeeping materials. CEA Internal report, DTN/STPA/LPC/2005/024.

[3]. Liger, K., Detritiation process for JET waste. CEA Internal report, DTN/STPA/LPC/2007/013.

[4]. P. Giroux, D. O., J C. Durand, FR2620262A1, Patent for solid organic waste treatment.

[5]. M. Glugla, A. Perevezentsev, D. Niyongabo, R. D. Penzhorn, A. Bell, P. Hermann, A PERMCAT Reactor for Impurity Processing in the JET Active Gas Handling System, Fusion Engineering and Design 49-50 (2000) 817-823

[6]. B. Bornschein, M. Glugla, K. Gunther, R. Lasser, T. L. Le, K. H. Simon, S. Welte, Tritium tests with a technical Permcat for final clean-up of ITER exhaust gases, Fusion Engineering and Design 69 (2003) 51-56

[7]. S. Tosti, L. Bettinali, F. Marini, Dispositivo per la rimozione di trizio da correnti gassose, Italian Patent n. RM2005U000165 (14 Dec. 2005).

The invention claimed is:

1. A process for the detritiation of radioactive waste containing tritium, comprising:
carrying out a thermal desorption by subjecting said waste, placed in a detritiation reactor (RT), to a flow of moist gas and subsequently recovering tritium in the form of gas by means of a membrane reactor (RM) in order to valorize the tritium for re-use, the thermal desorption comprising the following sub-steps:
A) shredding and uniformly mixing the waste to be detritiated;
B) placing said waste in a detritiation reactor (RT);
C) sending inert gas and demineralized water to an evaporation/mixing device;
D) feeding a moist gaseous mixture, constituted by said inert gas and vapour formed from said demineralized water, to said detritiation reactor (RT) so that said moist gaseous mixture traverses all the waste, giving rise to a formation of a moist gaseous current containing tritium;
E) sending said gaseous current containing tritium to a membrane reactor (RM); and
F) feeding said membrane reactor (RM) with a swamping gas, thus obtaining exit from the membrane reactor (RM) itself, as end products, of a gaseous current of isotopes containing tritium extracted from the waste and of a gaseous current of detritiated gases.

2. The process according to claim 1, wherein, in order to facilitate thermal desorption, the detritiation reactor (RT) is introduced into an oven that controls and regulates a temperature of the detritiation reactor (RT) around a pre-defined set-point value.

3. The process according to claim 2, wherein the pre-defined set-point value is 120° C.

4. The process according to claim 1, wherein the swamping gas of step F) is pure hydrogen.

5. The process according to claim 1,
wherein the detritiation reactor (RT) is operated at a pressure equal to or higher than atmospheric pressure, and
wherein the membrane reactor (RM) is operated at a pressure lower than atmospheric pressure.

6. The process according to claim 1, wherein, in order to keep the concentration of tritium within the detritiation reactor (RT) very low, the moist gaseous mixture flows at a flow rate equal to approximately 30 or 50 times the internal volume of the detritiation reactor (RT) per hour.

7. The process according to claim 1,
wherein the moist inert gas is kept within the detritiation reactor (RT) at a pressure slightly higher than atmospheric pressure, and
wherein the membrane reactor (RM) operates at a pressure of 100 mbar on a swamping-gas side and at a pressure of 900 mbar on a side of feed of gases coming from the detritiation reactor (RT).

8. The process according to claim 1, wherein a time of stay of the moist gaseous mixture in the detritiation reactor (RT) is long enough to guarantee transfer of tritium and of hydrogen isotopes, without high values of tritium concentration being reached in the moist gaseous current leaving the detritiation reactor (RT).

9. The process according to claim 1, wherein a time of stay of the waste in the detritiation reactor (RT) is long enough to guarantee that required values of decontamination are reached.

10. The process according to claim 4, wherein, in order to keep the concentration of tritium within the detritiation reactor (RT) very low, the moist gaseous mixture flows at a flow rate equal to approximately 30 or 50 times the internal volume of the detritiation reactor (RT) per hour.

* * * * *